United States Patent [19]

Diebel

[11] Patent Number: 4,622,102
[45] Date of Patent: Nov. 11, 1986

[54] AUTOMATICALLY OPERABLE DISTILLATION APPARATUS

[75] Inventor: Howard Diebel, St. Catherines, Canada

[73] Assignee: Moyer Diebel Limited, Jordan Station, Canada

[21] Appl. No.: 738,915

[22] Filed: May 29, 1985

[51] Int. Cl.⁴ .............................................. B01D 3/42
[52] U.S. Cl. .................................... 202/185.3; 202/83; 202/202; 202/206; 202/266; 159/44; 203/1; 203/10
[58] Field of Search ....................... 202/83, 185.3, 206, 202/266, 160, 234, 181, 202; 203/1, 10, 11, DIG. 22, 99, DIG. 18, DIG. 7; 422/62, 105, 110; 159/44, DIG. 35

[56] References Cited

U.S. PATENT DOCUMENTS

| | | | |
|---|---|---|---|
| 1,366,465 | 1/1921 | Kells | 202/206 |
| 1,379,631 | 5/1921 | Kells | 202/206 |
| 1,404,971 | 1/1922 | Kells | 202/206 |
| 1,404,972 | 1/1922 | Kells | 202/206 |
| 1,975,222 | 10/1934 | Brown | 203/1 |
| 2,049,486 | 8/1936 | Babcock | 203/DIG. 22 |
| 3,537,616 | 11/1970 | Diebel et al. | 222/66 |
| 3,687,817 | 8/1972 | Jimerson et al. | 202/185.3 |
| 4,331,514 | 5/1982 | Bauer | 202/185.3 |

Primary Examiner—Wilbur Bascomb
Attorney, Agent, or Firm—Hirons, Rogers & Scott

[57] ABSTRACT

The invention provides a compact automatically operating distillation apparatus comprising a baseplate that will free-stand, but is more usually located on a reservoir to receive the distillate, which usually is water. A boiler container having an electric heater is removably mounted on a support, which is movably mounted on the baseplate with the weight of the container and the water opposed by a spring. The support operates electric switches that open a solenoid-operated valve to supply water to the boiler when its weight decreases a predetermined amount, and that will switch off the heater if the boiler has insufficient water. The output of the boiler goes to a condenser coil which is supplied with cooling air by a fan. A float in the reservoir controls another switch that will stop operation when the reservoir is full.

4 Claims, 5 Drawing Figures

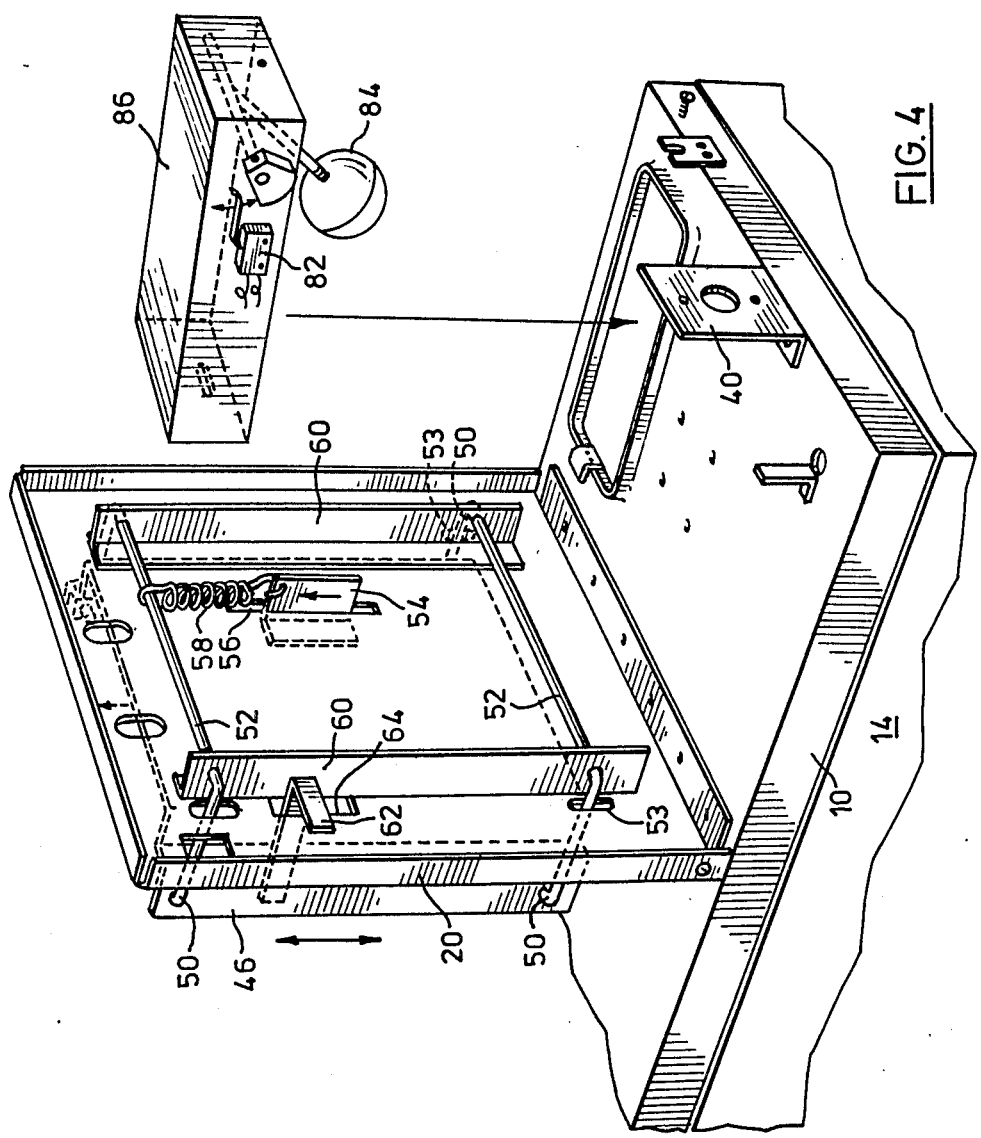

AUTOMATICALLY OPERABLE DISTILLATION APPARATUS

FIELD OF THE INVENTION

The present invention is concerned with improvements in or relating to distillation apparatus, and especially to such apparatus arranged for automatic operation.

REVIEW OF THE PRIOR ART

Distillation and condensation of the resultant water vapour is a long established procedure for the purification of water for commercial and laboratory use. With increasing pollution of water supplies by different chemicals the need has arisen for small compact units for home use for the purification of drinking water. Such units need to be adapted for automatic unattended operation without the need for the relatively costly control systems that are possible with commercial units.

DEFINITION OF THE INVENTION

It is therefore the principal object of the invention to provide a new compact distillation apparatus especially suited for automatic unattended domestic use.

In accordance with the present invention there is provided distillation apparatus comprising:
 a baseplate;
 a vertical structure mounted on the baseplate;
 a boiler container support mounted by the vertical structure for vertical movement therein;
 a boiler container removably mounted on the container support, the weight thereof and of the contained water urging the boiler container support downwards;
 an electric heater mounted on the boiler container for boiling the water therein;
 spring means operative between the container support and the vertical structure to oppose downward movement of the boiler container support;
 a solenoid operated water supply valve mounted by the baseplate and connected by pipe means to the boiler container for supply of water to the interior thereof to replenish the supply when required;
 first switch means operated in response to upward movement of the container support and connected to supply operating power to the solenoid valve when the weight of the boiler container has decreased by a predetermined amount to open the valve for the supply of replacement water to the container interior;
 a water vapour condenser mounted by the baseplate, receiving vapour from the boiler container interior via connecting pipe means and condensing it;
 an electric fan mounted by the baseplate to deliver cooling air to the condenser; and
 second switch means operated in response to upward movement of the support and connected to prevent operation of the heater when the weight of the boiler container and its contained water has decreased by a predetermined amount.

DESCRIPTION OF THE DRAWINGS

Distillation apparatus which is a particular preferred embodiment will now be described, by way of example, with reference to the accompanying diagrammatic drawings, wherein:

FIG. 4 is a further partial view with the boiler and condenser removed for clarity of illustration.

DESCRIPTION OF THE PREFERRED EMBODIMENT

Figure 3:
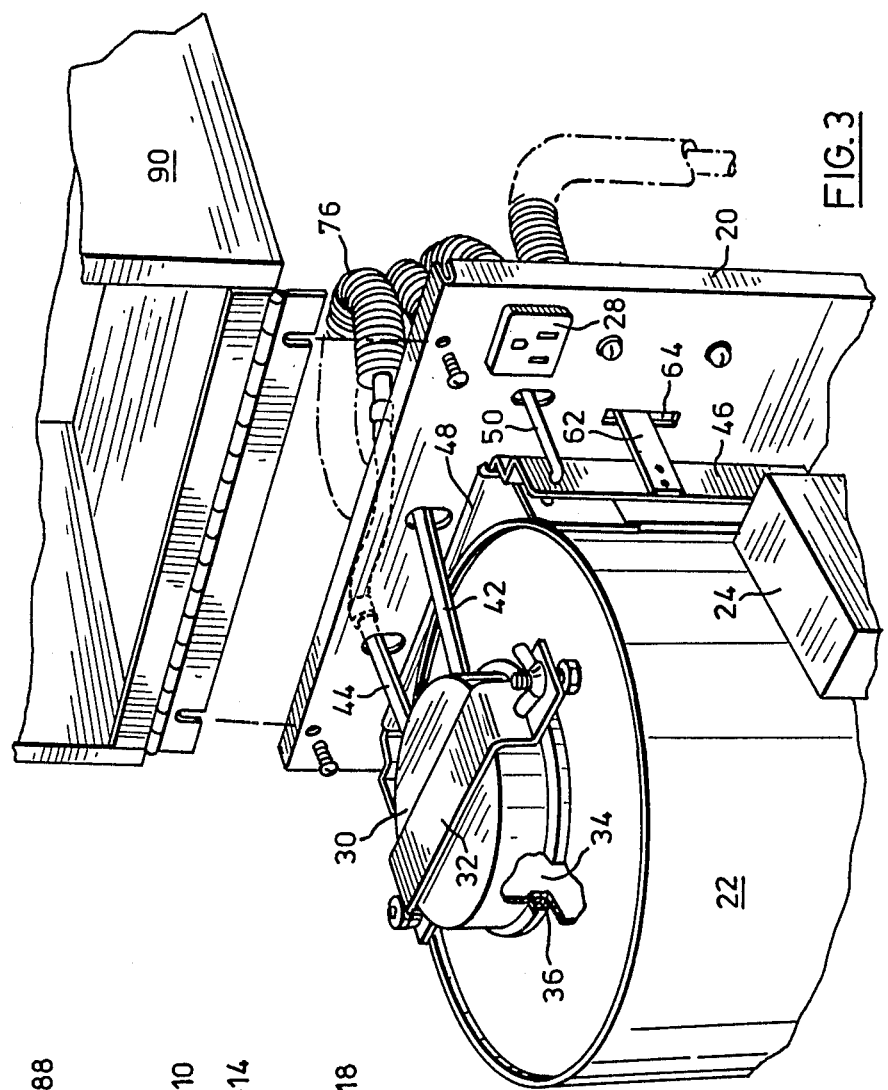
FIG. 3 is another partial exploded view with the boiler mounted on its support.

The distillation apparatus of the invention consists of a rectangular baseplate 10 on which all of the operative parts of the apparatus are mounted, the baseplate being provided with feet 12 (FIG. 2) to permit it to be placed on any convenient flat surface. The baseplate may also be mounted on an open-topped reservoir tank 14 having a front-mounted faucet 16 (FIG. 1) for withdrawal of the distilled water that collects therein. The reservoir tank may in turn be mounted on a wheeled stand 18, whenever required. The baseplate 10 is provided approximately mid-way along its length with a vertical partition 20 that serves to separate the boiler section thermally from the condenser section and also to operatively support the different parts of the apparatus.

The boiler consists of a cylindrical container 22 provided with an electric heater element 24 that is supplied via a cord 26 pluggable into a plug 28 on the partition. A removable lid 30 can be clamped by clamp 32 over the filling mouth 34 of the container and is sealed by an O-ring seal 36. Water is fed into the boiler from an electrically-operated water inlet solenoid valve 38 mounted on bracket 40 via an inlet pipe 42, the resulting water vapour exiting through a cylindrical filter screen 43 and outlet pipe 44.

The boiler container 22 is removably mounted on a vertically-movable plate-like support 46 by means of a hanger hook 48 fastened to the container, this hook being engagable over the upper horizontal edge of the support so that the container hangs on the support and its weight is applied thereto to urge it downwards. The support 46 is mounted on the partition by means of two vertically-spaced pairs of arms 50 provided by respective U-shaped members 52, the arms 50 pass through respective slots 53 in the partition and the members 52 are pivotally mounted on the other side thereof to provide a compact structure, being mounted for such pivotal movement by brackets 60 fastened to the respective side of the partition. An arm 54 (FIG. 4) extends from the support 46 through a vertically-elongated slot 56 in the partition and is connected by a tension spring 58 to the cross rod of the upper U-shaped member which connects the two upper arms 50 thereof. Another arm 62 fixed to the support extends through another respective vertically-elongated slot 64, and engages alternatively the operating arm of an upper micro-switch 66 or a lower micro-switch 68.

The solenoid valve 38 is supplied with operating current to open it from a source 70 via a manual switch 72 and the arm-operated first switch 68, the latter being normally-closed and held open as long as the weight of the container 22 is sufficient to hold the switch in that condition against the action of the spring 58. As the water evaporates and the container weight decreases the container rises until, with a predetermined loss in weight, the first switch opens, so that the solenoid valve also opens and replenishes the water. The heater 24 and a fan 74, to be described below, are supplied with operating current from the source 70 via arm operated second switch 66 that is closed while the container is sufficiently heavy to keep the arm 62 down, and is opened by the arm 62 as the container rises, so that the heater is not operative with a too-empty container.

The quantity of water in the container can therefore be controlled without the need for any element such as a float contacting the heated evaporating water, which would relatively quickly be coated with solid deposit and eventually become inoperative. The absence of any mechanical element in the container for water level control makes it relatively simple to remove the container, when required, for re-filling the removal of solid deposits produced by the evaporation of large quantities of water.

Figure 1:
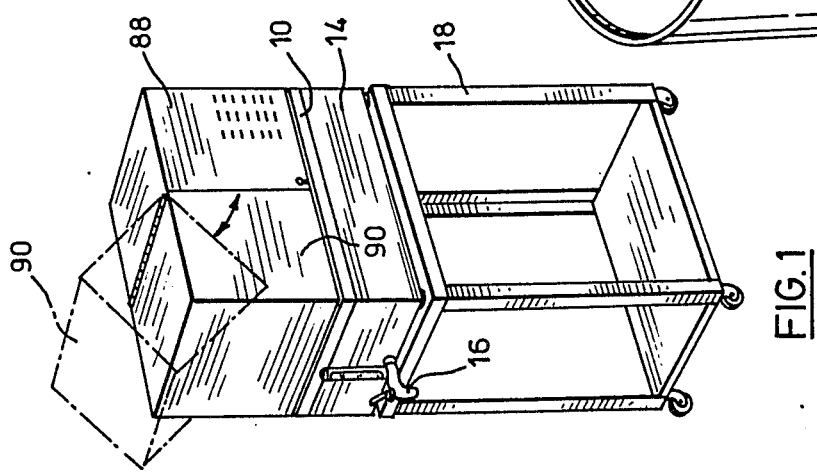
FIG. 1 is a perspective view of the entire apparatus.
Figure 2:
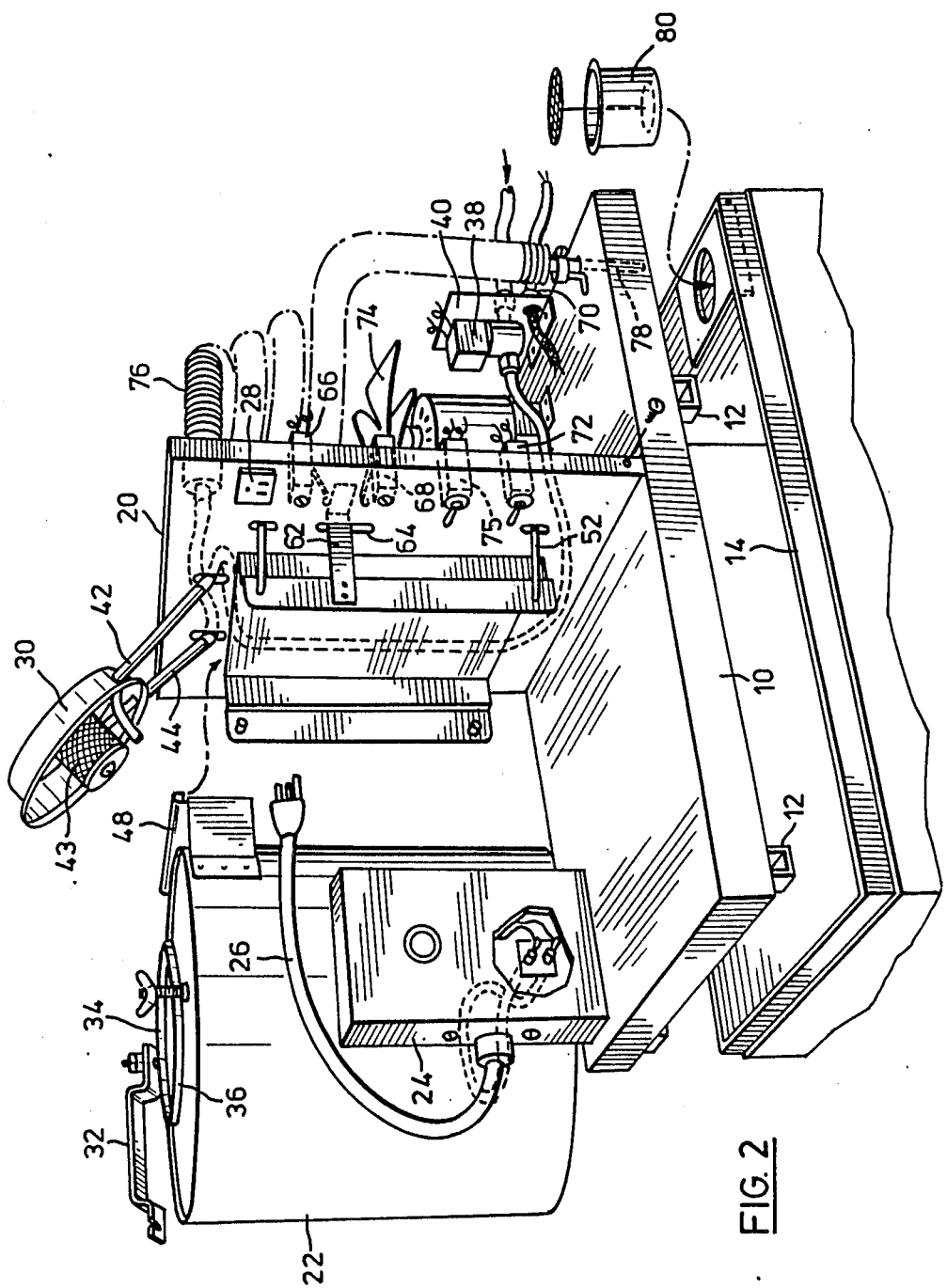
FIG. 2 is a partial exploded view from one side with the boiler shown separated from its support.
Figure 5:
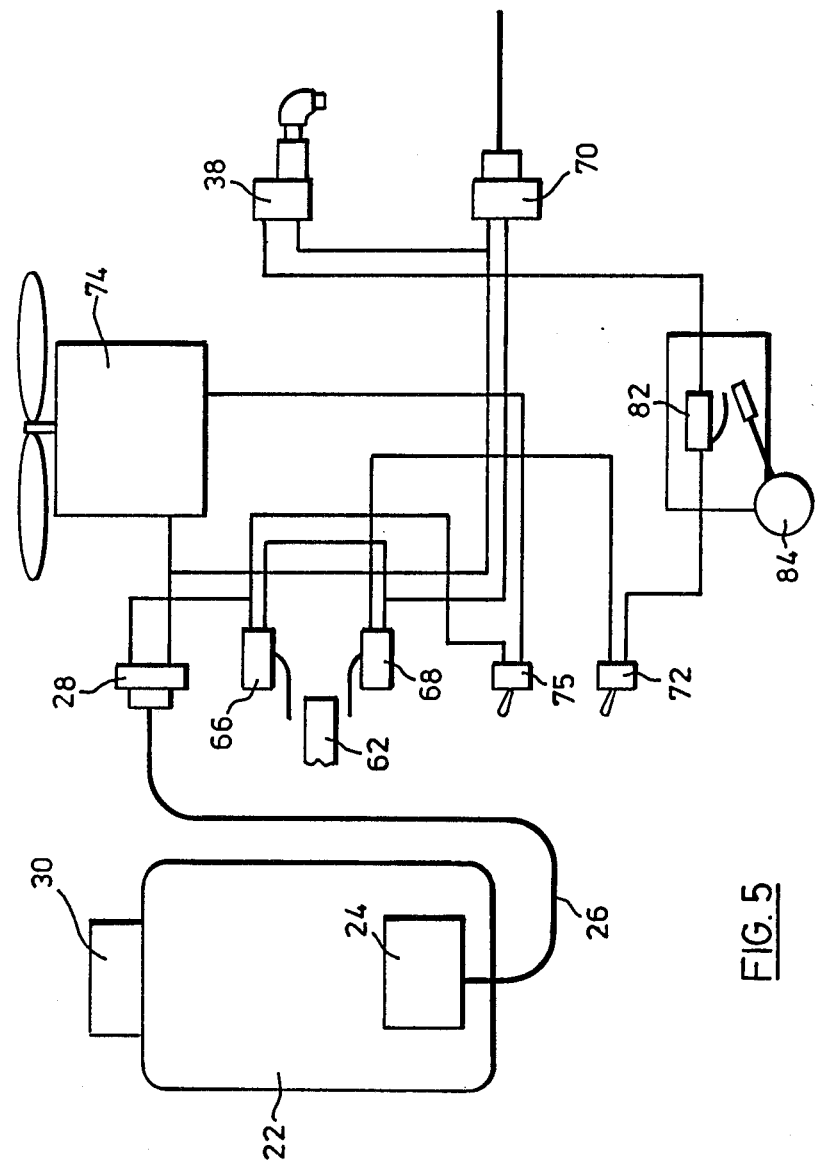
FIG. 5 is a circuit diagram showing the electrical circuit of the apparatus.

The water vapour entering the outlet pipe 44 passes through a condensing coil 76 comprising a helix of metal tubing which is subjected to the cooling action of a stream of air delivered by the fan 74. The outlet 78 (FIG. 2) of the coil 76 discharges into a removable cup filter 80 mounted at the respective corner of the reservoir. The power supply to the solenoid valve 38 also passes through a micro-switch 82 that is controlled by a float 84 pivotally mounted on a casing 86 which is removably mounted on the baseplate. When the reservoir is sufficiently full the float will move to a position in which the switch 82 is open, preventing the further supply of water to the container 22, so that operation ceases. This float is operative in relatively salt-free distilled water not subjected to forced evaporation, and is not therefore as subject to coatings as would be a float in the container 22. The condenser portion of the apparatus is enclosed by a removable louvred casing 88, while the boiler portion, which usually requires more frequent access, is enclosed by a cover 90 that is hinged to the vertical partition 20 so that it can be swung upwards, as illustrated in FIG. 1.

I claim:

1. Distillation apparatus comprising:
   a baseplate;
   a vertical structure mounted on the baseplate;
   a boiler container support means mounting the boiler container support on the vertical structure for vertical movement relative thereto;
   a boiler container for containing water to be boiled therein removably mounted on the boiler container support, whereby the weight thereof and of the contained water will urge the boiler container support downwards;
   an electric heater mounted on the boiler container for boiling the water therein;
   spring means operative between the container support and the vertical structure to oppose the said downwards movement of the container support under the weight of the boiler container and the contained water;
   an electrically-operated water supply valve mounted on the baseplate and connected by pipe means to the boiler container for supply of water to the interior thereof;
   first switch means operated in response to upward movement of the container support and connected to supply operating power to the electrically-operated water supply valve when the weight of the boiler container has decreased by a predetermined amount to open the valve for the supply of replacement water to the container interior;
   a water vapour condenser mounted on the baseplate;
   pipe means connecting the boiler container interior and the condenser interior to supply vapour from the boiler container interior to the condenser interior;
   an electric fan mounted by the baseplate to deliver cooling air to the condenser;
   second switch means operated in response to upward movement of the boiler container support and connected to the heater to stop it when the weight of the boiler container has decreased by a predetermined amount; and
   switch operating means on the boiler container support for said operation of the first and second switch means upon said upward movement thereof.

2. Apparatus as claimed in claim 1, wherein the said vertical structure is a partition disposed between the boiler container and the water vapour condenser and thermally separating them from one another.

3. Apparatus as claimed in claim 2, wherein the said means mounting the boiler container support comprise spaced pairs of pivoted arms passing through the partition and pivotally connected thereto on the condenser side.

4. Apparatus as claimed in claim 1, including: a reservoir for distilled water; the water vapour condenser opening into the reservoir to discharge the water condensed therein into the reservoir;
   a float in the reservoir;
   a third switch means operated by the reservoir float when the water in the reservoir reaches a predetermined level;
   the third electric switch being connected to the electrically-operated water supply valve to close the valve and prevent supply of replacement water to the boiler container when the water level reaches the said predetermined level.

* * * * *